United States Patent
Hahn

(10) Patent No.: US 10,438,494 B1
(45) Date of Patent: Oct. 8, 2019

(54) GENERATION OF FLIGHT PLANS FOR AERIAL VEHICLES

(71) Applicant: Amazon Technologies, Inc., Seattle, WA (US)

(72) Inventor: Camerin Cole Hahn, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 390 days.

(21) Appl. No.: 15/289,645

(22) Filed: Oct. 10, 2016

(51) Int. Cl.
*G08G 5/00* (2006.01)
*G05D 1/00* (2006.01)
*G05D 1/02* (2006.01)

(52) U.S. Cl.
CPC ......... *G08G 5/0039* (2013.01); *G05D 1/0088* (2013.01); *G05D 1/0202* (2013.01)

(58) Field of Classification Search
None
See application file for complete search history.

(56) References Cited

U.S. PATENT DOCUMENTS

| | | | | |
|---|---|---|---|---|
| 2,552,511 A * | 5/1951 | Barrow | ...................... | G01S 1/02 244/184 |
| 2,878,469 A * | 3/1959 | Casabona | ................. | G01S 1/02 342/456 |
| 3,274,599 A * | 9/1966 | Page | ......................... | G01S 1/02 342/407 |
| 5,465,924 A * | 11/1995 | Schneider | ............... | F16F 15/02 244/118.1 |
| 5,636,123 A * | 6/1997 | Rich | ..................... | G01S 5/0072 342/29 |
| 5,814,753 A * | 9/1998 | Rieger | .................... | F42B 12/66 102/293 |
| 10,084,495 B2 * | 9/2018 | Hampel | ............ | H04L 25/03006 |
| 2006/0040660 A1 * | 2/2006 | Cruz | .................. | H04B 7/18506 455/431 |
| 2009/0318138 A1 * | 12/2009 | Zeng | .................. | H04B 7/18506 455/431 |

FOREIGN PATENT DOCUMENTS

CN 104730497 B * 2/2017

* cited by examiner

*Primary Examiner* — Shelley Chen
(74) *Attorney, Agent, or Firm* — Kilpatrick Townsend & Stockton LLP

(57) ABSTRACT

Methods and systems for generating flight plans for aerial vehicles based at least in part on communication performance are described. First information about a set of access points may be accessed. Second information about a flight path for an aerial vehicle to move from a first point to a second point may be accessed. A set of directions for the aerial vehicle to move between the first point and the second point may be generated. The set of directions may be generated based at least in part on a communication criterion and the second information about the flight path. The flight path may be updated based at least in part on the set of directions.

20 Claims, 10 Drawing Sheets

GENERATION OF FLIGHT PLANS FOR AERIAL VEHICLES

BACKGROUND

Aerial vehicles, including unmanned aerial vehicles (UAVs), may communicate with other aerial vehicles, ground stations, and certain services over wireless data networks (e.g., Long-Term Evolution (LTE)). These wireless networks may include a collection of access points. An aerial vehicle may selectively connect to these access points in order to receive and/or send data. These wireless networks may encode such data in accordance with any one of a number of schemas (e.g., frequency-division multiplexing schemas). When the aerial device operates at a low velocity relative to the access points, the data sent and received by the access points may be unaffected. When the aerial vehicle operates at higher relative velocities, however, the data may be lost or otherwise negatively affected.

BRIEF DESCRIPTION OF THE DRAWINGS

Various embodiments in accordance with the present disclosure will be described with reference to the drawings, in which.

DETAILED DESCRIPTION

Figure 1:
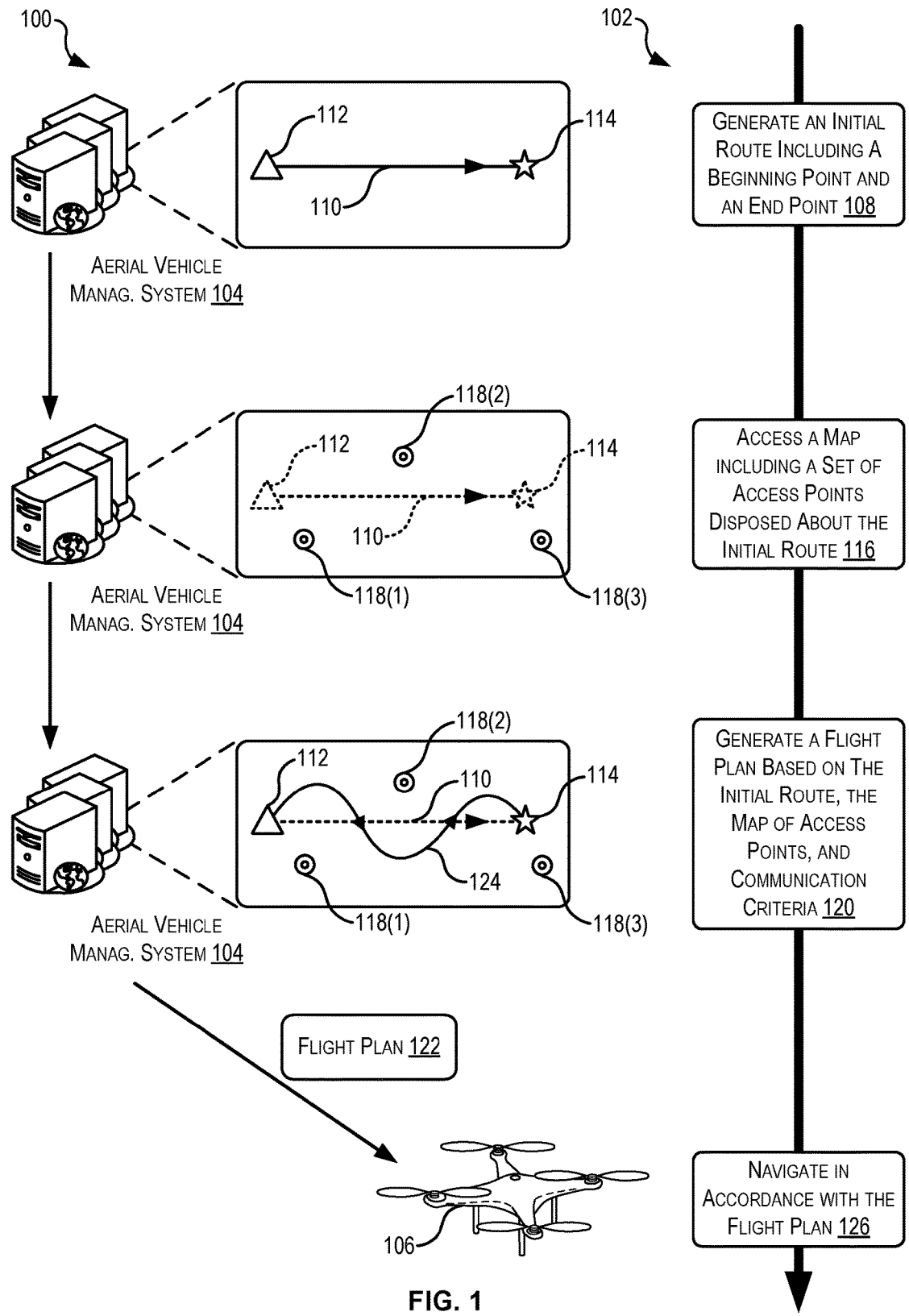
FIG. 1 is an example diagram depicting an example flow for generating flight plans for aerial vehicles based on communication performance, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples described herein are directed to, among other things, techniques relating to generating flight plans for aerial vehicles based on communication performance. In particular, the techniques include evaluation of certain aspects of a wireless network (e.g., likelihood for maintaining a suitable communication connection) in light of an expected flight path of an aerial vehicle. This evaluation may reveal regions along the flight path where communications over the wireless network are likely to be disrupted. These disruptions (e.g., signal loss, unrecognizable signals, etc.) may be present as a result of Doppler shift. For example, when the aerial vehicle approaches an access point of the wireless network while also being connected to the access point (e.g., communicating via the access point), radio-frequency signals that include communication data may begin shift (e.g., frequency changes and/or wavelength changes), resulting communication disruptions due to sub-carrier signals no longer being orthogonal (e.g., beginning to overlap). In wireless networks that use Orthogonal Frequency Domain Multiplexing (OFDM), this shifting of subcarrier signals may cause signal degradation due to carrier frequency offsets. In some examples, this impairment may be referred to as intercarrier interference.

The techniques described herein may improve the functioning of aerial vehicles by minimizing the risk of disruptions to communication caused by increased flight speed. As communication improves, especially certain communications with a home base system, the risk of aerial vehicle collision events is reduced. In an aerial vehicle delivery scenario—or other arrangement that relies on aerial vehicles to complete certain tasks—the techniques described herein may increase throughput. For example, a balance may be achieved between ensuring some level of communication system performance and achieving some minimum time for task completion (e.g., delivery of a payload to a customer). Previous techniques may have been unable to strike such a delicate balance between these—and other—interests.

Turning now to a particular example, in this example, an initial delivery route for an aerial vehicle to fly from a warehouse (or other item location) to a customer's location (e.g., home) is computed. The initial delivery route can be a straight-line path connecting the two points. A set of cellular towers that surround the initial route may be selected from a map of cellular towers. The particular cellular towers in the set may be selected based on a likelihood that the aerial vehicle will connect to the particular cellular towers while flying along the initial delivery route. Regions along the initial delivery route may be determined where communications between the aerial vehicle and the particular cellular towers would fail to meet communication criteria, if the aerial vehicle were to fly along the initial delivery route at a particular speed. Thus, the communication criteria may be dependent on speed of the aerial vehicle. In this manner, the regions may correspond to instances where Doppler shift would interrupt the communications beyond some level. To account for these regions (and minimize interruptions to the communications), the initial delivery route may be altered in some manner and a set of directions may be generated for executing the altered delivery route. For example, a maximum speed may be computed above which the aerial vehicle cannot exceed for the entirety of the initial delivery route. In another example, a speed profile may be computed that indicates variable speeds corresponding to the different regions of the initial delivery route. In another example, the initial delivery route may be adjusted to include one or more radial routes that, when followed, cause the aerial vehicle to travel around the set of access points in a radial manner. The radial routes may also be associated with variable speeds. The adjusted initial delivery route and/or the set of directions may be provided to the aerial vehicle in the form of a flight plan. The aerial vehicle may use the flight plan to execute its task (e.g., deliver a package to the customer's home), which will include flying from the warehouse to the customer's home.

Turning now to the figures, FIG. 1 illustrates a simplified diagram 100 and an example process 102 for generating flight plans for aerial vehicles based on communication performance, according to at least one example. The diagram 100 depicts example states that correspond to the blocks in the process flow 102. The diagram 100 includes an aerial vehicle management system 104 and an aerial vehicle 106. As described in detail herein, the aerial vehicle management system 104 may include any suitable combination of server computing devices configured to manage the operations of multiple aerial vehicles 106. For example, the aerial vehicle management system 104 may coordinate delivery of packages by the aerial vehicles 106. In this example, the aerial vehicle management system 104 may compute directions for the aerial vehicles 106 to complete the deliveries in an autonomous manner, a semi-autonomous manner (e.g., some tasks performed without directions, some tasks performed with directions), or a controlled manner. Depending on the level of management provided by the aerial vehicle management system 104, the communications between the aerial vehicle management system 104 and the aerial vehicles 106 may be periodic, continuous, event-driven, and/or provided in any other manner.

The process 102 begins at 108 by generating an initial route 110 including a beginning point 112 and an end point 114. This may be performed by the aerial vehicle management system 104. The initial route 110 may be generated in accordance with a set of initial generation rules. The initial generation rules may identify a set of conditions and parameters for generating the initial route 110. For example, using the beginning point 112 and the end point 114 as input, the initial route 110 may be generated as a straight line path connecting the two points 112, 114. In some examples, either one of the beginning point 112 and/or the end point 114 may be variable. In this example, generating the initial route 110 may include generating more than one initial route, each extending between different beginning points 112 and different end points 114. In this example, the process 102 may evaluate each possible initial route and/or provide each possible initial route to the aerial vehicle 106 for selection. The aerial vehicle 106 may select a possible initial route using an optimization parameter.

The beginning point 112 may correspond to a material handling facility or other location where the aerial vehicle 106 begins or continues its journey along the initial route 110. In some examples, the initial route 110 may be part of a larger route, in which case the beginning point 112 and/or the end point 14 may represent waypoints along the larger route. The beginning point 112 may represent more than one location (e.g., multiple material handling facilities), and the process 102 may be used to select from which location to begin the initial route 110.

The aerial vehicle 106 may be configured to execute delivery of packages to customers. In such a case, the end point 114 may correspond to a particular delivery location of a customer. In some examples, the end point 114 may correspond to any other suitable location to where the aerial vehicle 106 may navigate. The beginning point 112 and/or the end point 114 may be represented as a set of geographic coordinates (e.g., Global Positioning System (GPS) coordinates, local East, North, Up (ENU) coordinates, local North, East Down (NED) coordinates, latitude and longitude, and any other suitable coordinates). The initial route 110 may include a set of route segments connecting the beginning point 112, the end point 114, and a set of waypoints connecting the set of route segments. In some examples, the initial route 110 includes a single route segment that extends between the beginning point 112 and the end point 114.

At 116, the process 102 accesses a map including a set of access points 118(1)-118(N) disposed about the initial route 110. This may be performed by the aerial vehicle management system 104. A few of the access points 118 (e.g., 118(1)-118(3)) are illustrated in the diagram 100. The map may be stored in a map database or other storage structure. The map may include information that describes the access points 118. For example, such information may include geographic locations, conditions for connecting, owners, frequencies of operation, available bandwidth, usage analytics, encoding schemas supported, and any other suitable information.

The access points 118 may allow any suitable wireless device to connect to any suitable network. In some examples, the access points 118 may be cellular access points such as cellular towers including any suitable combination of antennas and electronic communications equipment to create a cell (or adjacent) cells in a cellular network. In some examples, the access points 118 are wireless access points (WAPs) including any suitable combination of antennas and electronic communications equipment to enable a Wi-Fi compliant device to connect. The access points 118 may be capable of supporting any suitable data network operating according to any suitable standard such as, for example, WiMax, Mobile WiMax, Wi-Fi, 3G, 4G, LTE, LTE Advanced, 5G, or any other suitable standard.

At 120, the process 102 generates a flight plan 122 based at least in part on the initial route, the map of access points 118, and communication criteria. This may be performed by the aerial vehicle management system 104. The flight plan 122 may include the beginning point 112, the end point 114, a flight path 124 extending between the beginning point 112 and the end point 114, a set of directions (e.g., path segments, waypoints, speeds, headings, and the like) for navigating along the flight path 124, and any other suitable information. In some examples, the flight path 124 may be the same or substantially similar to the initial route 110. In the illustrated example, however, the flight path 124 may be different from the initial route 110. In some examples, the initial route 110, the flight path 124, and other routes or paths described herein, may be defined by a polynomial function extending between the beginning point 112 and the end point 114. For example, either of the initial route 110 or the flight path 124, or a segment thereof, may be represented as a spline defined by a first polynomial function. Speeds applicable to the spline or other segment may be defined by a second polynomial function. For example, the speeds may be included in a speed profile that corresponds to the spline.

The communication criteria may represent aspects of the communications between the aerial vehicle 106 and the aerial vehicle management system 104 that are affected by the speed of the aerial vehicle 106 with respect to the access points 118. For example, as the aerial vehicle 106 executes the flight plan 122, the aerial vehicle 106 may send data (e.g., telemetry data) to the aerial vehicle management system 104 over a network composed of the access points 118. The aerial vehicle management system 104 may also send data to the aerial vehicle 106 over the network composed of the access points 118. If the aerial vehicle 106 flies too swiftly with respect to the access points 118, throughput may be affected as a result of intercarrier interference. Thus, the communication criteria may be considered when speeds of the aerial vehicle 106 are being computed to ensure that the speeds of the aerial vehicle 106 do not result in intercarrier interference or at least reduce the impact of intercarrier interference on communications. The results of intercarrier interference are less pronounced (or even absent) when the aerial vehicle 106 moves radially with respect to the access points 118. Thus, the communication criteria may be considered when flight paths of the aerial vehicle 106 are being computed to ensure that the combination of flight paths and speeds along those flight paths do not result in intercarrier interference, or at least reduce the impact of intercarrier interference.

The communication criteria may represent one or more objective measures of the quality of the data being transferred between the aerial vehicle management system 104 and the aerial vehicle 106. For example, the communication criteria may indicate a measure of permissible throughput, measure of permissible data loss, or other comparable measure of the data being transferred between the aerial vehicle management system 104 and the aerial vehicle 106 via the access points 118. In some examples, the throughput accounted for by the measure of permissible throughput is based at least in part on movement (e.g., speed and/or direction) of the aerial vehicle 106 relative to the access points 118. For example, certain movements of the aerial vehicle 106 (e.g., flying directly towards or directly away from an access point 118) may result in intercarrier interference (e.g., disruption of the signals carrying the data such as a frequency change and/or a wavelength change).

The flight plan 122 may be generated in a manner that attempts to reduce, eliminate, or at least account for throughput, data loss, or other data measures in accordance with the communication criteria, while also optimizing certain aspects the initial route 110. To this end, the aerial vehicle management system 104 may generate the flight plan 122 to include the flight path 124. As illustrated, the flight path 124 may include any suitable combinations of radial segments. The radial segments may be selected to cause the aerial vehicle 106 to move radially around the access points 118. Doing so may, in some examples, reduce the amount of data loss in communications sent over the wireless network due to Doppler shift. In some examples, as a result of the radial segments, the aerial vehicle 106 may be able to fly at faster speeds relative to the access points 118 and still suitably send and receive data over the network. In some examples, this may be because Doppler shift has a less noticeable impact on communications when the aerial vehicle 106 is moving radially relative to the access points 118 by which the aerial vehicle 106 is communicating. In some examples, these faster speeds, which may also be represented as velocities, may be included as part of the flight plan 122. In addition, specific directional data may be included in the flight plan 122 that allows the aerial vehicle 106 to navigate along the flight path 124.

At 126, the process 102 navigates in accordance with the flight plan 122. This may be performed by the aerial vehicle 106. In particular, a management device of the aerial vehicle 106, as described herein, may cause the aerial vehicle 106 to navigate in accordance with the flight plan 122. In some examples, the process 102 may also include the aerial vehicle management system 104 sending the flight plan 122 to the aerial vehicle 106. In some examples, the aerial vehicle 106 performs the process 102 and/or performs part of the process 102 on-the-fly as it navigates along the flight path 124. For example, while executing the flight plan 122, the aerial vehicle 106 may detect a change in the initial conditions used to generate the flight plan 122. Based on this, the aerial vehicle 106 may update the flight plan 122 by generating a new flight path, generating new speeds, generating new segments, and the like in a manner similar as described with reference to block 120.

Figure 2:
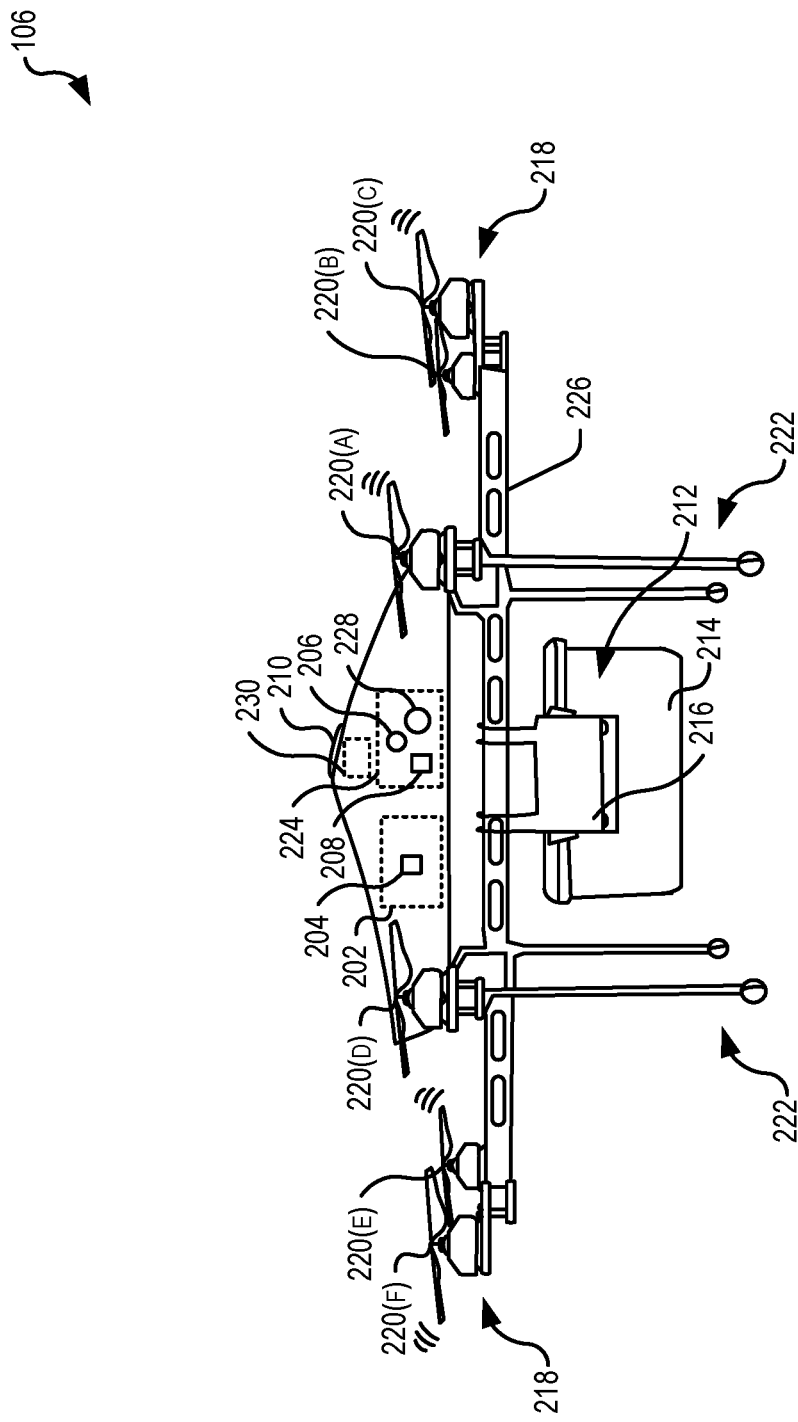
FIG. 2 is an example aerial vehicle relating to generating flight plans for aerial vehicles based on communication performance, according to at least one example.

FIG. 2 illustrates an example aerial vehicle 106 for implementing techniques relating to generating flight plans for aerial vehicles based on communication performance, according to at least one example. The aerial vehicle 106 may be designed in accordance with commercial aviation standards and may include multiple redundancies to ensure reliability. For purposes of this specification, the aerial vehicle 106 may include a plurality of systems or subsystems operating under the control of, or at least partly under the control of, a management system 202. The management system 202 may include an aerial vehicle management device 204 (e.g., an onboard computer) for autonomously or semi-autonomously controlling and managing the aerial vehicle 106 and, in some examples, for enabling remote control by a pilot. The aerial vehicle management device 204 will be discussed in more detail with reference to FIG. 3. Portions of the management system 202, including the aerial vehicle management device 204, may be housed under top cover 210. As used herein, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the aerial vehicle 106 and detecting objects) (not shown), radiofrequency identification (RFID) capability (not shown), and interfaces capable of speech interpretation and recognition (not shown).

The aerial vehicle 106 may also include a communication system 224 housed within the top cover 210. The communication system 224 may include one or more light sensors 228 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 206 (e.g., microphone, noise filters, and other sensors for capturing sound), and one or more output devices 208 (e.g., microphone, speaker, laser projector, light projector, and other devices for outputting communication information). In some examples, the light sensors 228 include one or more image capture devices. The management system 202 may be configured to receive information and provide information via components of the communication system 224. For example, the aerial vehicle 106 may support two-way communication with operators. Two-way communication may be beneficial for verifying operators' identities that interact with the aerial vehicle 106, for posing questions to operators, and for providing instructions to operators. In some examples, the communication system 224 may operate semi-autonomously or autonomously.

As shown in FIG. 2, the aerial vehicle 106 may also include a retaining system 212. The retaining system 212 may be configured to retain payload 214. In some examples, the retaining system 212 may retain the payload 214 using friction, vacuum suction, opposing arms, magnets, and other retaining methods. As illustrated in FIG. 2, the retaining system 212 may include two opposing arms 216 (only one is illustrated) configured to retain the payload 214. The aerial vehicle management device 204 may be configured to control at least a portion of the retaining system 212. In some examples, the retaining system 212 may be configured to release the payload 214 in one of a variety of ways. For example, the retaining system 212 (or other system of the aerial vehicle 106) may be configured to release the payload 214 with a winch and spool system, by the retaining system 212 releasing the payload, and other methods of releasing the payload. In some examples, the retaining system 212 may operate semi-autonomously or autonomously.

In FIG. 2, the payload 214 is illustrated as a delivery box. In some examples, the delivery box may include one or more packages or items intended for delivery to a recipient. The payload 214, whether as a delivery box or otherwise, may be configured for delivery using a variety of different methods. For example, the payload 214 may include a parachute that opens and slows the payload's 214 descent as it falls to its delivery location. In some examples, the payload 214 may include padding surrounding its package to reduce the impact of a drop from the aerial vehicle 106 above the ground. The aerial vehicle 106 may also deliver the payload 214 by fully landing on the ground and releasing the retaining system 212.

Further, the aerial vehicle 106 may include propulsion system 218. In some examples, the propulsion system 218 may include rotary blades or otherwise be a propeller-based system. As illustrated in FIG. 2, the propulsion system 218 may include a plurality of propulsion devices, a few of which, 220(A)-220(F), are shown in this view. Each propulsion device may include one or more propellers, a motor, wiring, a balance system, a control mechanism, and other features to enable flight. In some examples, the propulsion system 218 may operate at least partially under the control of the aerial vehicle management device 204. In some examples, the propulsion system 218 may be configured to adjust itself without receiving instructions from the aerial vehicle management device 204. Thus, the propulsion system 218 may operate semi-autonomously or autonomously. The propulsion system 218 may enable multi-directional flight of the aerial vehicle 106 (e.g., by adjusting each propulsion device individually). In some examples, the aerial vehicle 106 may be a fixed-wing unmanned aerial vehicle.

The aerial vehicle 106 may also include a landing structure 222. The landing structure 222 may be adequately rigid to support the aerial vehicle 106 and the payload 214. The landing structure 222 may include a plurality of elongated legs which may enable the aerial vehicle 106 to land on and take off from a variety of different surfaces. The plurality of systems, subsystems, and structures of the aerial vehicle 106 may be connected via frame 226. The frame 226 may be constructed of a rigid material and be capable of receiving, via different connections, the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226.

The aerial vehicle 106 may also include a deployable slowing device 230. The deployable slowing device 230 may include any suitable device capable of slowing down the descent of the aerial vehicle 106 when deployed. For example, the deployable slowing device 230 may include a streamer, a parachute, or other comparable structure coupled to a deploying means. The deploying means may be electrically actuated, mechanically actuated, and/or actuated in any other suitable manner. In some examples, the aerial vehicle 106 may include more than one deployable slowing device 230. For example, a plurality of such devices 230 may be deployed about the perimeter of the aerial vehicle 106 (e.g., at each of the propulsion devices 220).

Figure 3:
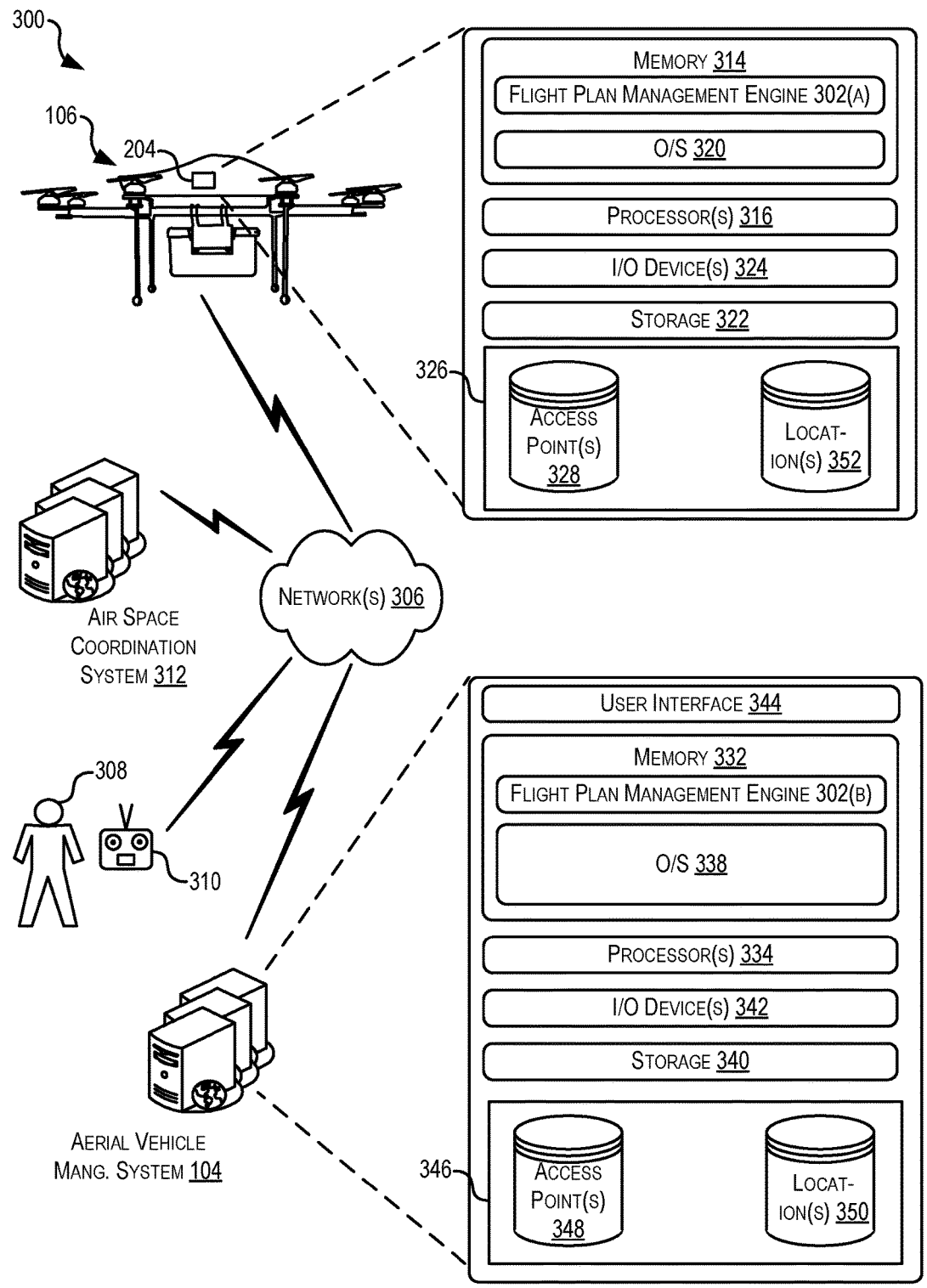
FIG. 3 is an example schematic architecture and devices relating to generating flight plans for aerial vehicles based on communication performance, according to at least one example.

FIG. 3 illustrates an example schematic architecture 300 for implementing techniques relating to generating flight plans for aerial vehicles based on communication performance, according to at least one example. The architecture 300 may include the aerial vehicle management system 104, the aerial vehicle 106, an air space coordination system 312, and a controller 310.

The aerial vehicle management system 104 may be associated with an electronic marketplace (not shown) and interface with purchase and delivery services of the electronic marketplace. In this manner, the aerial vehicle management system 104 may coordinate delivery of items via aerial vehicles, such as the aerial vehicle 106, to customers of the electronic marketplace. In some examples, the aerial vehicle management system 104 may coordinate flight plans of the aerial vehicle 106 and other aerial vehicles 106 (e.g., compute routes, identify landing locations, etc.). In some examples, the aerial vehicle management system 104 may be a stand-alone service devoted to computing flight plans.

The aerial vehicle management system 104 may be in communication with the aerial vehicle 106, the controller 310, and the air space coordination system 312 via one or more network(s) 306 (hereinafter, "the network 306"). An operator 308 may utilize the controller 310 to control aspects of the aerial vehicle 106 under certain circumstances. The network 306 may include any one or a combination of many different types of networks, such as cable networks, the Internet, wireless networks, cellular networks, radio networks, and other private and/or public networks. The aerial vehicle management system 104 may be configured to provide back-end control of the aerial vehicle 106 prior to, during, and after completion of its mission. In some examples, the aerial vehicle 106 may be configured to accomplish its mission (e.g., deliver its payload to a customer) with little to no communication with the aerial vehicle management system 104.

The air space coordination system 312 may be operated by a government agency or other third-party. Generally, the air space coordination system 312 may be configured to coordinate air space reserved for operation of unmanned aerial vehicles such as the aerial vehicles 106. This may be achieved, in part, by the air space coordination system 312 resolving air space requests received from aerial vehicles (e.g., the aerial vehicle 106), aerial vehicle management systems (e.g., the aerial vehicle management system 104), and/or other user devices associated with the operation of the aerial vehicles. The air space coordination system 312 may provide a service that is accessible by the different devices and/or services and that automatically resolves requests. In some examples, the aerial vehicle management system 104 may provide a requested flight path and a requested time window to fly the flight path to the air space coordination system 312. The air space coordination system 312 may evaluate whether an actual volume of air space (e.g., a cylinder of air of a certain radius that follows the flight path, a rectangle of air space that extends from the ground to 400 feet above the ground and follows the flight path, etc.) is available that would enable execution of the flight plan. If so, the air space coordination system 312 may indicate in a data store or otherwise that a particular volume of air space has been allocated to the aerial vehicle management system 104 or to a particular vehicle managed by the aerial vehicle management system 104. The aerial vehicle management system 104 may also receive a communication indicating the boundaries of the reserved air space and a timeframe in which the reserved air space may be used. In some examples, the aerial vehicle 106 may be configured to communicate with the air space coordination system 312 (e.g., directly or via the aerial vehicle management system 104) in real-time as it flies in the reserved air space. This may be desirable to update the reserved air space if the aerial vehicle 106 encounters unforeseen conditions that may cause the aerial vehicle 106 to fly outside the reserved air space or to fly in the reserved air space outside of the reserved timeframe. Such unforeseen conditions may include mechanical, electrical, and other failures on the aerial vehicle 106, weather conditions (e.g., a strong headwind), detection of other aircraft within the reserved airspace, or any other suitable condition.

Turning now to the details of the aerial vehicle management device 204 of the aerial vehicle 106, the aerial vehicle management device 204 may include at least one memory 314 and one or more processing units (or processor(s)) 316. The processor(s) 316 may be implemented as appropriate in hardware, computer-executable instructions, software, firmware, or combinations thereof. Computer-executable instruction, software, or firmware implementations of the processor(s) 316 may include computer-executable or machine-executable instructions written in any suitable programming language to perform the various functions described. The memory 314 may include more than one memory and may be distributed throughout the aerial vehicle management device 204 and/or the aerial vehicle management system 104. The memory 314 may store program instructions (e.g., a flight plan management engine 302(*a*)) that are loadable and executable on the processor(s) 316, as well as data generated during the execution of these programs. Depending on the configuration and type of memory including the flight plan management engine 302(*a*), the memory 314 may be volatile (such as random access memory (RAM)) and/or non-volatile (such as read-only memory (ROM), flash memory, or other memory). The aerial vehicle management device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM. The memory 314 may also include an operating system 320.

In some examples, the aerial vehicle management device 204 may also include additional storage 322, which may include removable storage and/or non-removable storage. The additional storage 322 may include, but is not limited to, magnetic storage, optical disks, and/or tape storage. The disk drives and their associated computer-readable media may provide non-volatile storage of computer-readable instructions, data structures, program modules, and other data for the computing devices.

The memory 314 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the flight plan management engine 302(*a*). The modules of the flight plan management engine 302(*a*) may include one or more components, modules, and the like. The aerial vehicle management device 204 may also include input/output (I/O) device(s) and/or ports 324, such as for enabling connection with a keyboard, a mouse, a pen, a voice input device, a touch input device, a display, speakers, a printer, or other I/O device. The I/O device(s) 324 may enable communication with the other systems of the aerial vehicle 106 (e.g., other parts of the management system, power system, communication system, navigation system, propulsion system, and the retaining system).

The aerial vehicle management device 204 may also include a data store 326. The data store 326 may include one or more databases, data structures, or the like for storing and/or retaining information associated with implementation of the techniques described herein. In some examples, the data store 326 may include databases, such as an access point database 328 and a location database 352.

The access point database 328 may be used to retain information about access points used with techniques described herein. For example, the information may include information used to produce one or more access point maps. The information may also be stored in other data structures besides maps. In any event, the access point database 328 may include information about geographic locations of access points, conditions for connecting to access points (e.g., protocols, identifiers, etc.), available bandwidth (e.g., in terms of total, instantaneous availability, estimated availability, whether sufficient to meet a request or handle a communication, etc.), usage information (e.g., peak loading or other demand projections, etc.), encoding schemas supported (e.g., OFDM, etc.), and any other suitable information. This information may be used as part of flight plan generation.

The location database 352 may be used to retain information about locations relevant to the aerial vehicle 106. For example, such information may include geographic information about customer locations (e.g., delivery addresses) and about locations of material handling facilities or other nodes of a delivery network. For example, information about the beginning point 112 and the end point 114 may be stored in the location database 352. In some examples, the location database 352 may include any other suitable location information that may be used by the aerial vehicle 106 in implementing and/or affecting its flight plan.

Turning now to the aerial vehicle management system 104, the aerial vehicle management system 104 may include one or more service provider computers, perhaps arranged in a cluster of servers or as a server farm. In some examples, the aerial vehicle management system 104 may include one or more virtual computers. The aerial vehicle management system 104 may include at least one memory 332 and one or more processing units (or processor(s)) 334. The processor(s) 334 may be implemented as appropriate in hardware, computer-executable instructions, software, firmware, or combinations thereof. Computer-executable instructions, software or firmware implementations of the processor(s) 334 may include computer-executable or machine-executable instructions written in any suitable programming language to perform the various functions described. The memory 332 may include more than one memory and may be distributed throughout the aerial vehicle management system 104. The memory 332 may store program instructions (e.g., the flight plan management engine 302(*b*)) that are loadable and executable on the processor(s) 334, as well as data generated during the execution of these programs. The memory 332 may be volatile (such as random access memory (RAM)) and/or non-volatile (such as read-only memory (ROM), flash memory, or other memory).

The aerial vehicle management system 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM. The memory 332 may also include an operating system 338.

The flight plan management engine 302(*b*), in some examples, may function similar to the flight plan management engine 302(*a*). For example, when the aerial vehicle 106 is in network communication with the aerial vehicle management system 104, the aerial vehicle 106 may receive at least some instructions from the aerial vehicle management system 104 as the flight plan management engine 302(*b*) is executed by the processors 334. In some examples, the aerial vehicle 106 executes the flight plan management engine 302(*a*) independent of the aerial vehicle management system 104.

In some examples, the aerial vehicle management system 104 may also include additional storage 340, which may include removable storage and/or non-removable storage. The additional storage 340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the aerial vehicle management system 104. The aerial vehicle management system 104 may also include input/output (I/O) device(s) and/or ports 342, such as for enabling connection with a keyboard, a mouse, a pen, a voice input device, a touch input device, a display, speakers, a printer, or other I/O device.

In some examples, the aerial vehicle management system 104 may include a user interface 344. The user interface 344 may be utilized by an operator, or other authorized user to access portions of the aerial vehicle management system 104. In some examples, the user interface 344 may include a graphical user interface, web-based applications, programmatic interfaces such as application programming interfaces (APIs), or other user interface configurations.

For example, the user interface 344 may enable an operator to remotely control the aerial vehicle 106. The aerial vehicle management system 104 may also include data store 346. The data store 346 may include one or more databases, data structures, or the like for storing and/or retaining information associated with the aerial vehicle management system 104. The data store 346 may include databases, such as an access point database 348 and a location database 350. The access point database 348 and the location database 350 may include similar information as the access point database 328 and the location database 352. In some examples, the aerial vehicle management system 104 may store a larger amount of information in the data store 346 than the aerial vehicle management device 204 is capable of storing in the data store 326. Thus, in some examples, at least a portion of the information from the databases in the data store 346 is copied to the databases of the data store 326, e.g., periodically, occasionally, in connection with an event, or otherwise. In this manner, the data store 326 may have up-to-date information, without having to maintain the databases. In some examples, this information may be transferred as part of a flight plan prior to the aerial vehicle 106 beginning the flight plan, on an as-needed basis, and in any other suitable manner.

Figure 4:
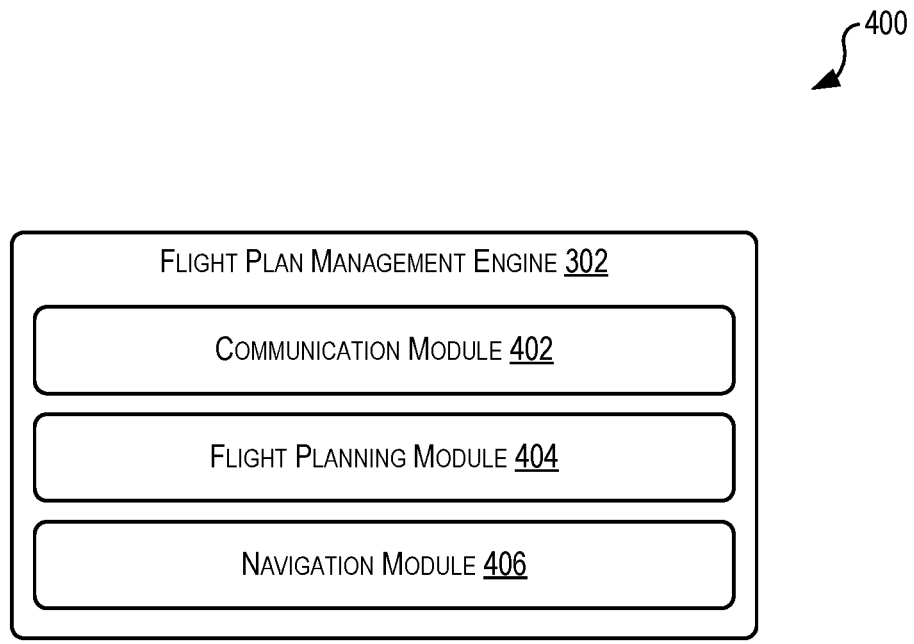
FIG. 4 is an example device relating to generating flight plans for aerial vehicles based on communication performance, according to at least one example.

FIG. 4 illustrates an example device 400 including the flight plan management engine 302. The flight plan management engine 302 may be configured to manage one or more sub-modules, components, engines, and/or services directed to examples disclosed herein. For example, the flight plan management engine 302 includes a communication module 402, a flight planning module 404, and a navigation module 406. While these modules are illustrated in FIG. 4 and will be described as performing discrete tasks with reference to the flow charts, it is understood that FIG. 4 illustrates example configurations and other configurations performing other tasks and/or similar tasks as those described herein may be implemented according to the techniques described herein. Other modules, components, engines, and/or services may perform the same tasks as the flight plan management engine 302 or other tasks. Each module, component, or engine may be implemented in software, firmware, hardware, and in any other suitable manner.

The communication module 402 may be configured to process communications between the other modules of the flight plan management engine 302, elements of the aerial vehicle management device 204 (e.g., the data store 326), and/or elements of the architecture 300 (e.g., the air space coordination system 312, the aerial vehicle management system 104 including the data store 346, etc.). In some examples, the communication module 402 may manage the operation of the communication system of the aerial vehicle 106.

The flight planning module 404 may be configured to generate flight plans for aerial vehicles 106, as described herein. This may include using information accessed by the communication module 402 (e.g., access point information, location information, and communications from the air space coordination system 312). In some examples, the flight plans may include generic aspects and specific aspects. The generic aspects may be reused for different aerial vehicles and/or for different flight plans. The specific aspects may be specific to an aerial vehicle and/or a flight plan.

The navigation module 406 may be configured to instruct the aerial vehicle 106 to navigate. In some examples, this may include accessing a flight plan and navigating in accordance with the flight plan.

FIGS. 5, 6, 7, 8, and 9 illustrate example flow diagrams showing respective processes 500, 600, 700, 800, and 900, as described herein. These processes 500, 600, 700, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 5:
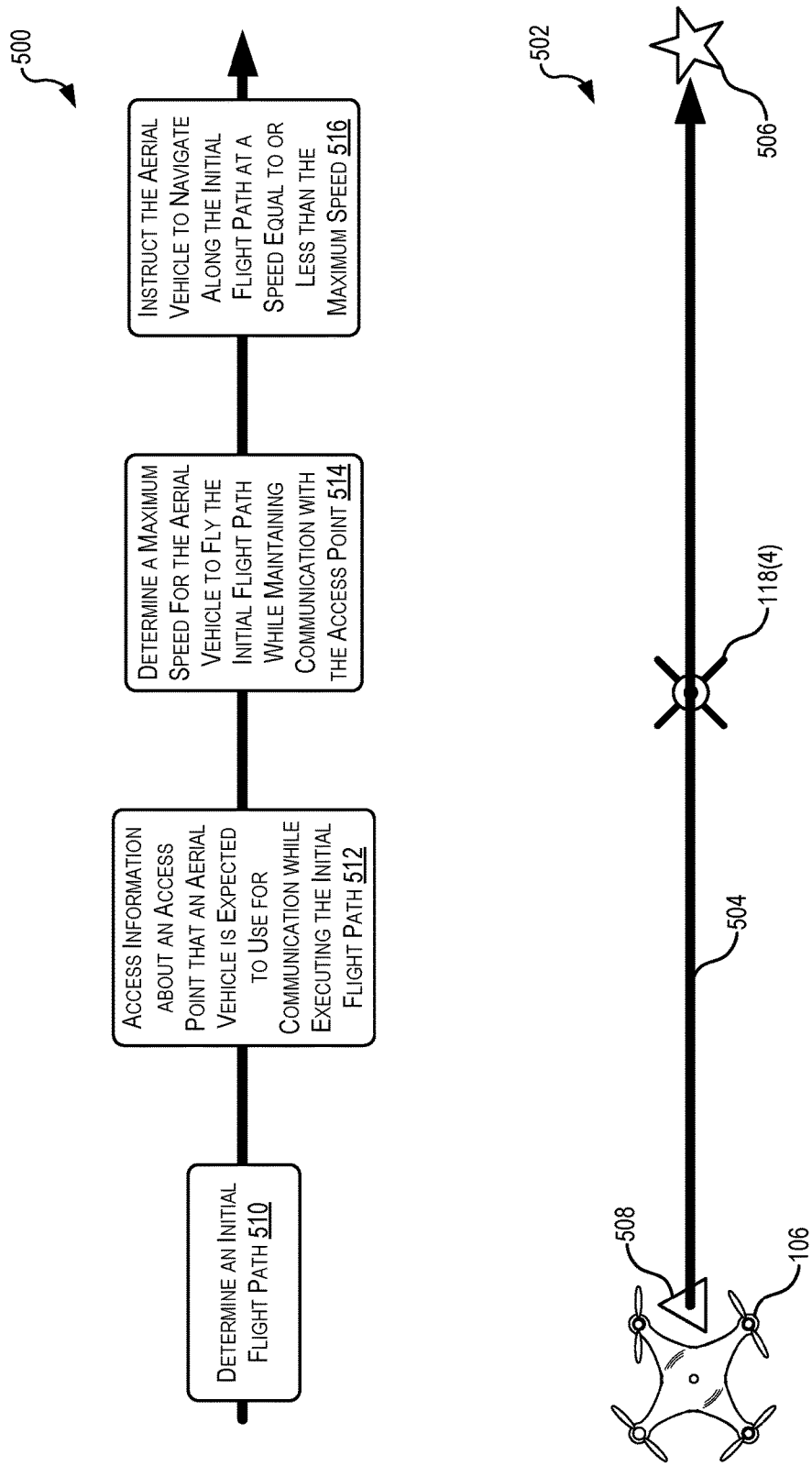
FIG. 5 is an example diagram depicting an example flow for implementing techniques relating to generating flight plans for aerial vehicles based on communication performance, according to at least one example.

FIG. 5 illustrates the process 500 and a simplified diagram 502 for generating flight plans for aerial vehicles based on communication performance, according to at least one example. In particular, the process 500 and the diagram 502 may correspond to a process whereby an aerial vehicle is instructed along a straight path to a destination location. The diagram 502 depicts example states that correspond to the blocks in the process flow 500. The flight plan management engine 302, whether embodied in the aerial vehicle 106, the aerial vehicle management system 104, or a suitable combination of the foregoing, may perform the process 500 of FIG. 5.

The process 500 begins at 510 by determining an initial flight path 504. This may be performed by the flight planning module 404 (FIG. 4). The initial flight path 504 may extend from a beginning location 508 to a destination location 506. In some examples, the initial flight path 504 may be considered a most-direct route (e.g., a straight line route) between a starting location and the destination location 506.

At 512, the process 500 accesses information about an access point 118(4) that the aerial vehicle 106 is expected to use for communication while executing the initial flight path 504. This may be performed by the communication module 402 (FIG. 4). The information about the access point 118(4) may be accessed from a database or other comparable storage structure. In some examples, the information is accessed from a service that maintains information about access points. In some examples, the information may indicate a geographic location of the access point 118(4), which may be disposed along the initial flight path 504. In the diagram 602, the access point 118(4) is located directly between the beginning location 508 and the destination location 506. In some examples, it may be inferred from the geographic location of the access point 118(4) with respect to the initial flight path 504 that the aerial vehicle 106 is expected to use the access point 118(4) for future communications. In some examples, an access point selection algorithm may be used to approximate how the aerial vehicle 106 will selectively connect to the access point 118(4) and/or other access points 118. For example, when the environment includes more than one access point 118(4), the access point selection algorithm may be used to determine a likelihood, for each respective access point 118(4), of the aerial vehicle 106 connecting to the access point 118(4). In this manner, the process 500 may be performed with knowledge of which access points 118 will likely be used and in which regions along the initial flight path 504. In some examples, determining the likelihoods may be performed as a sub-process or otherwise of the process 500. In some examples, selection of an access point 118 may be based at least in part on bandwidth availability, signal strength, signal reliability, location, and other object measures.

The aerial vehicle 106 may use the access point 118(4) to send and/or receive any suitable communications including voice, data, video, and the like. In some examples, the communications include data streams such as a video feed, an audio feed, and the like.

At 514, the process 500 determines a maximum speed for the aerial vehicle 106 to fly the initial flight path 504 while maintaining communication with the access point 118(4). This may be performed by the flight planning module 404. In this example, the speed may be determined to ensure that the aerial vehicle 106 is able to maintain some level of connection with the access point 118(4). For example, the maximum speed may be determined in a manner that takes into account the consequence of Doppler shift on communication signals propagating between the aerial vehicle 106 and the access point 118(4). For example, it may be determined that to ensure a suitable level of communications between the aerial vehicle and the access point 118(4) along the initial flight path 504, the aerial vehicle 106 should not exceed 65 Knots. In some examples, the example discussed with reference to FIG. 5 illustrates an example wherein a maximum speed is computed. In other examples, a variable speed may be computed that would enable the aerial vehicle 106 to travel at speeds exceeding 65 Knots at certain regions along the initial flight path 504 and at or below 65 Knots at other regions along the initial flight path 504.

At 516, the process 500 instructs the aerial vehicle 106 to navigate along the initial flight path 504 at a speed equal to or less than the maximum speed. This may be performed by the navigation module 406 (FIG. 4). Instructing the aerial vehicle 106 may include generating a flight plan based at least in part on the maximum speed, the initial flight path, the destination location 506, and any other suitable information. The flight plan may include a set of instructions for the aerial vehicle 106. The set of instructions may include speed instructions, direction instructions, elevation instructions, and the other instructions suitable for instructing the aerial vehicle 106 to navigate along the initial flight path 504. In at least this manner, the flight plan may be generated based at least in part on communication performance (e.g., in a manner that ensures suitability and/or reliability of communications). The flight plan may be received by the aerial vehicle 106 prior to the aerial vehicle 106 beginning the initial flight path 504. In some examples, the flight plan may be received by the aerial vehicle 106 after the aerial vehicle 106 has begun flying along the initial flight path 504. Navigating along the initial flight path 504 may include navigating to the destination location 506 and back to the beginning location 508 along the same initial flight path 504.

In some examples, the set of flight instructions may be determined in a manner that seeks to optimize one or more parameters. Such parameters may include, for example, flight time, battery or power consumption, line of sight to access points, selection of a beginning location, and any other suitable parameter relating to optimization of the flight plan.

Figure 6:
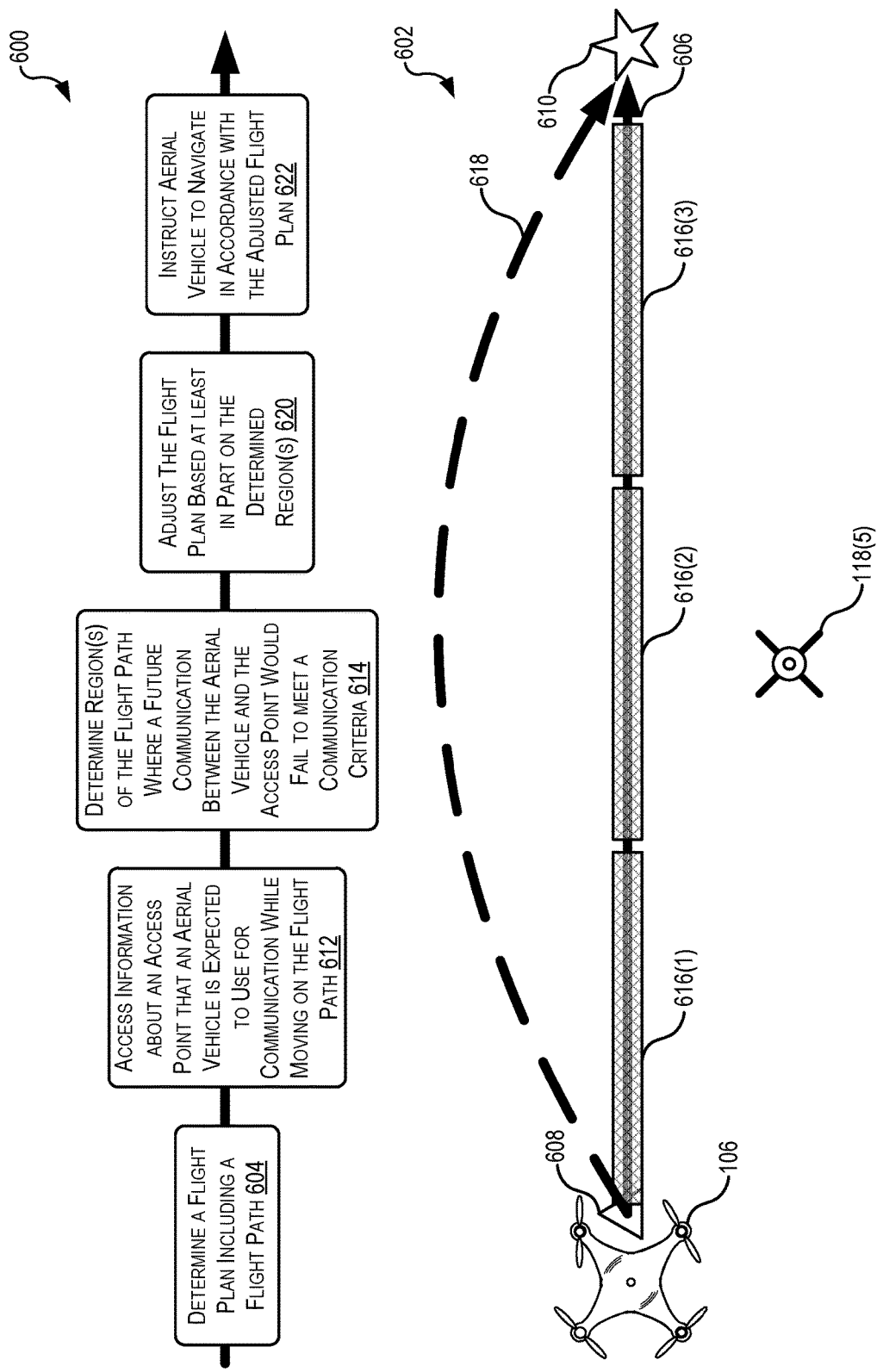
FIG. 6 is an example diagram depicting an example flow for implementing techniques relating to generating flight plans for aerial vehicles based on communication performance, according to at least one example.

FIG. 6 illustrates the process 600 and a simplified diagram 602 for generating flight plans for aerial vehicles based on communication performance, according to at least one example. In particular, the process 600 and the diagram 602 may correspond to a process whereby a flight plan is adjusted based on communication performance. The diagram 602 depicts example states that correspond to the blocks in the process flow 600. The flight plan management engine 302, whether embodied in the aerial vehicle 106, the aerial vehicle management system 104, or a suitable combination of the foregoing, may perform the process 600 of FIG. 6.

The process 600 begins at 604 by determining a flight plan including a flight path 606. This may be performed by the flight planning module 404 (FIG. 4). The flight path 606 may extend between a beginning location 608 and a destination location 610. If the process 600 were not performed, the aerial vehicle 106 may navigate along the flight path 606 similarly as discussed with reference to FIG. 5 (e.g., without exceeding a maximum speed). In some examples, performance of the process 600 may reveal a more optimal manner for the aerial vehicle to move between the beginning location 608 and the destination location 610, as compared to the process 500. This may include adjustments to the flight path 606 (e.g., introducing radial bends, curves, or the like), generation of variable operating speeds for the aerial vehicle 106 to move based at least in part on proximity to the access point 118(5), and other similar adjustments.

At 612, the process 600 accesses information about an access point (e.g., the access point 118(5)) that the aerial vehicle 106 is expected to use for communication while moving on the flight path 606. This may be performed by the communication module 402 (FIG. 4) and in a similar manner as block 512 in the process flow 500. In the diagram 602, the access point 118(5) is offset from the flight path 606, but the techniques are equally applicable when the access point 118(5) is located in line with the flight path 606.

At 614, the process 600 determines a region of the flight path 606 where a future communication between the aerial vehicle 106 and the access point 118(5) would fail to meet communication criteria. This may be performed by the flight planning module 404. The communication criteria may include a measure of permissible data loss in the communications of the aerial vehicle with the access point 118(5) and other access points 118, when appropriate. For example, the measure may be in terms of a percentage, bytes, and the like. In some examples, the communication criteria are evaluated over the entire flight path 606 (e.g., overall criteria). In some examples, the communication criteria are evaluated over different segments or regions of the flight path 606 (e.g., regional communication criteria). For example, the flight path 606 may be divided into any suitable number of regions. In the illustrated example, the flight path 606 has been divided into three regions 616(1)-616(3). At 616, the process 600 may determine one of the regions 616 where the future communication would fail to meet the communication criteria.

In some examples, assuming a constant speed along the flight path 606, Doppler shift may affect radio-frequency signals passing between the aerial vehicle 106 and the access point 118(5) differently depending on the current region 616 where the aerial vehicle 106 is operating. This may be because when the aerial vehicle 106 is located in different regions 616 it has a different orientation with respect to the access point 118(5). In some examples, when the aerial vehicle 106 is approaching the access point 118(5) (e.g., located in the region 616(1)) and moving away from the access point 118(5) (e.g., located in the region 616(3)), the effects on signal transmission from Doppler shift may be higher than when the aerial vehicle 106 is passing by the access point 118(5) (e.g., located in the region 616(2)). In other examples, when the aerial vehicle 106 is approaching the access point 118(5) (e.g., located in the region 616(1)) and moving away from the access point 118(5) (e.g., located in the region 616(3)), the effects on signal transmission from Doppler shift may be lower than when the aerial vehicle 106 is passing by the access point 118(5) (e.g., located in the region 616(2)). At 614, the process 600 may also include using any suitable techniques to determine the degree to which signal transmission will be affected in each of the region(s) 614. Information about this determination may be used to determine how to adjust the flight path 606 and/or the speeds at which the aerial vehicle 106 should operate along the flight path 606 or along an adjusted flight path 618.

At 620, the process 600 adjusts the flight plan based at least in part on the determined region(s) 616 where the future communications would fail to meet the communication criteria. This may be performed by the flight planning module 404. Adjusting the flight plan may include adjusting the adjusting speeds (e.g., information included in the flight plan) along the flight path 606, adjusting the flight path 606 to create the adjusted flight path 618, computing new speed(s) for the adjusted flight path 618, and any other suitable adjustment.

Adjusting speeds along the flight path 606 may include computing a speed profile for the aerial vehicle 106 that includes variable speeds. For example, the speed profile may include a first speed for the aerial vehicle 106 for moving in the region 616(1), a second speed for the aerial vehicle 106 for moving in the region 616(2), and a third speed for the aerial vehicle 106 for moving in the region 616(2). If the flight path 606 were to include more regions 616, the speed profile may include more speed divisions, at least some of which may include the same speeds and some of which may include different speeds. In some examples, the speeds may be computed and associated with the regions in a manner that enables communications that meet the communication criteria.

Adjusting the flight path 606 to create the adjusted flight path 618 may include adjusting the direction of travel of the aerial vehicle 106. This may reduce the likelihood that signal transmissions between the aerial vehicle 106 and the access point 118(5) will be negatively affected by Doppler shift. For example, the adjusted flight path 618 may include a radial curve with respect to the access point 118(5). This may enable the aerial vehicle 106 to travel at a higher speed as compared to the flight path 606 and still maintain suitable communications with the access point 118(5). This may be because the effects of Doppler shift are minimized when the aerial vehicle 106 moves radially with respect to the access point 118(5). The diagram 602 illustrates a top view of the flight path 606, the access point 118(5), and the adjusted flight path 618. Thus, the adjusted flight path 618 is illustrated as curving to the left around the access point 118(5), perhaps at the same or a similar elevation as the flightpath 606. It is understood, however, that the flight path 606 may be adjusted in any suitable manner. For example, the flight path 606 may be adjusted to create one or more radial curves that extend vertically above the access point 118(5) (e.g., with one or more elevations that are greater than a maximum elevation of the access point 118(5)). The flight path 606 may be adjusted to create one or more radial curves that extend vertically below and to the side of the access point 118(5) (e.g., with one or more elevations that are less than a maximum elevation of the access point 118(5)). The flight path 606 may be adjusted to include radial curves in a combination of directions (e.g., up and to the right, up and to the left, down and to the right, down and to the left, etc.).

While only one access point 118(5) is illustrated along with the adjusted flight path 618 including one radial curve, it is understood that, in other implementations, the adjusted route 618 may include other radial curves to account for other access points 118.

Adjusting the flight path 606 may also include computing new speeds for the aerial vehicle 106 for traveling along the adjusted flight path 618. As introduced previously, these new speeds may, in some examples, be greater than the speeds the aerial vehicle 106 could move if the aerial vehicle 106 were to travel a straight-line path (e.g., the flight path 606) between the beginning location 608 and the destination location 610. In some examples, the adjusted route 618 may be divided into a set of segments and a speed may be computed for each segment.

At 622, the process 600 instructs the aerial vehicle 106 to navigate in accordance with the adjusted flight plan. This may be performed by the navigation module 406 (FIG. 4). In some examples, navigating in accordance with the adjusted flight plan may include providing the adjusted flight plan to the aerial vehicle 106. In some examples, the flight plan, including the flight path 606, may be adjusted while the aerial vehicle 106 is flying. For example, the aerial vehicle 106 may receive information about an unexpected obstacle, a change in expected characteristics of the access point 118(5) (e.g., unavailable, insufficient bandwidth, unavailable signals, etc.), a command from the air space coordination system 312, or for any other suitable reason. In some examples, the flight plan may be adjusted because the aerial vehicle 106 determines that current communications between the aerial vehicle 106 and the access point 118(5) fail to meet the communication criteria. In this manner, adjusting the flight path 606 may be a precomputed action, in response to certain events, and/or as some other dynamic action.

Figure 7:
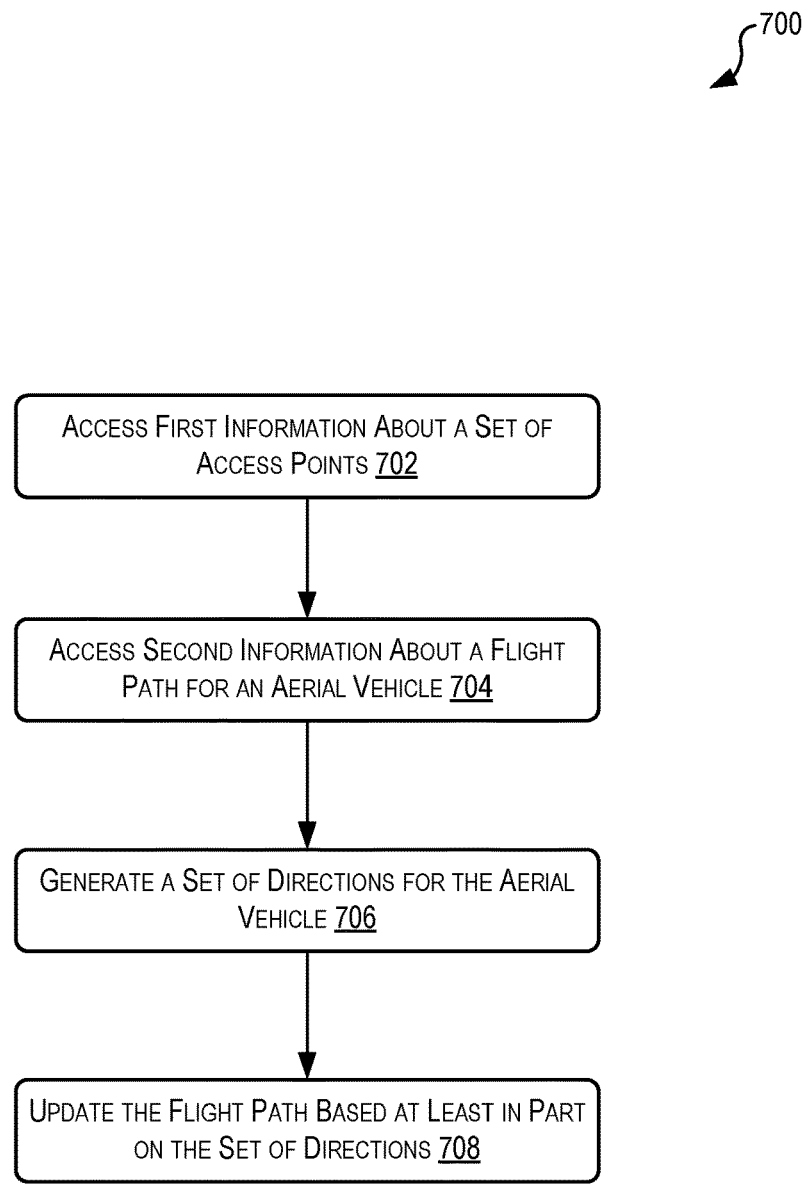
FIG. 7 is an example flow diagram depicting example acts for implementing techniques relating to generating flight plans for aerial vehicles based on communication performance, according to at least one example.

FIG. 7 illustrates the process 700 for generating flight plans for aerial vehicles based on communication performance, according to at least one example. In particular, the process 700 updates a flight path based at least in part on communication performance. The flight plan management engine 302, whether embodied in the aerial vehicle 106, the aerial vehicle management system 104, or a suitable combination of the foregoing, may perform the process 700 of FIG. 7.

The process 700 begins at 702 by accessing first information about a set of access points. This may be performed by the communication module 402 (FIG. 4). The set of access points may be configured to communicate with electronic devices using radio-frequency transmission. In some examples, individual access points of the set of access points may be configured to communicate with the electronic devices using OFDM or some other suitable encoding schema. The set of access points may be a set of cellular access points such as cellular towers.

At 704, the process 700 accesses second information about a flight path for an aerial vehicle. This may be performed by the communication module 402. The flight path may include a first point and a second point. In some examples, the first point and the second point may be disposed with a geographic region. The set of access points may also be disposed within the geographic region. The flight path may include a shortest distance path between the first point and the second point. In some examples, prior to accessing the second information, the process 700 generates the flight path.

At 706, the process 700 generates a set of directions for the aerial vehicle. This may be performed by the flight planning module 404 (FIG. 4). The set of directions may be directions for the aerial vehicle to move between the first point and the second point. Generating the set of directions may be based at least in part on (i) a communication criterion applicable to communications of the aerial vehicle with the set of access points while moving between the first point and the second point, and (ii) the second information about the flight path.

The communication criterion may include a measure of permissible data loss in the communications of the aerial vehicle with the set of access points. In some examples, the communications may include radio-frequency signals. In this example, the data loss accounted for by the measure of permissible data loss may be based at least in part on movement of the aerial vehicle relative to the set of access points that causes changes to at least one of frequency of the radio-frequency signals or wavelength of the radio-frequency signal. In some examples, the measure of permissible data loss may include a threshold percentage of data loss. In this example, generating the set of directions may include determining a maximum speed for the aerial vehicle to move between the first point and the second point to ensure that data loss in the communications of the aerial vehicle with the set of access points meets the threshold percentage.

In some examples, generating the set of directions may include segmenting the flight path into a plurality of segments based at least in part on the second information, and computing speed values for the individual segments of the plurality of segments based at least in part on the communication criterion. In some examples, a first speed value of the speed values is greater than a second speed value of the speed values. In some examples, a portion of the plurality of segments form a curve relative to at least one access point of the set of access points.

At 708, the process 700 updates the flight path based at least in part on the set of directions. This may be performed by the flight planning module 404. In some examples, updating the flight path is further based at least in part on an optimization parameter including at least one of a time-to-destination parameter (e.g., a measure of the total time to travel to the destination and/or to return back to a beginning), a power consumption parameter (e.g., a measure of an amount of power consumed by the aerial vehicle to travel along the flight path), or a line-of-sight parameter (e.g., a measure that ensures the aerial vehicle maintains a line of sight with one or more access points and/or line of sight with a controller).

Figure 8:
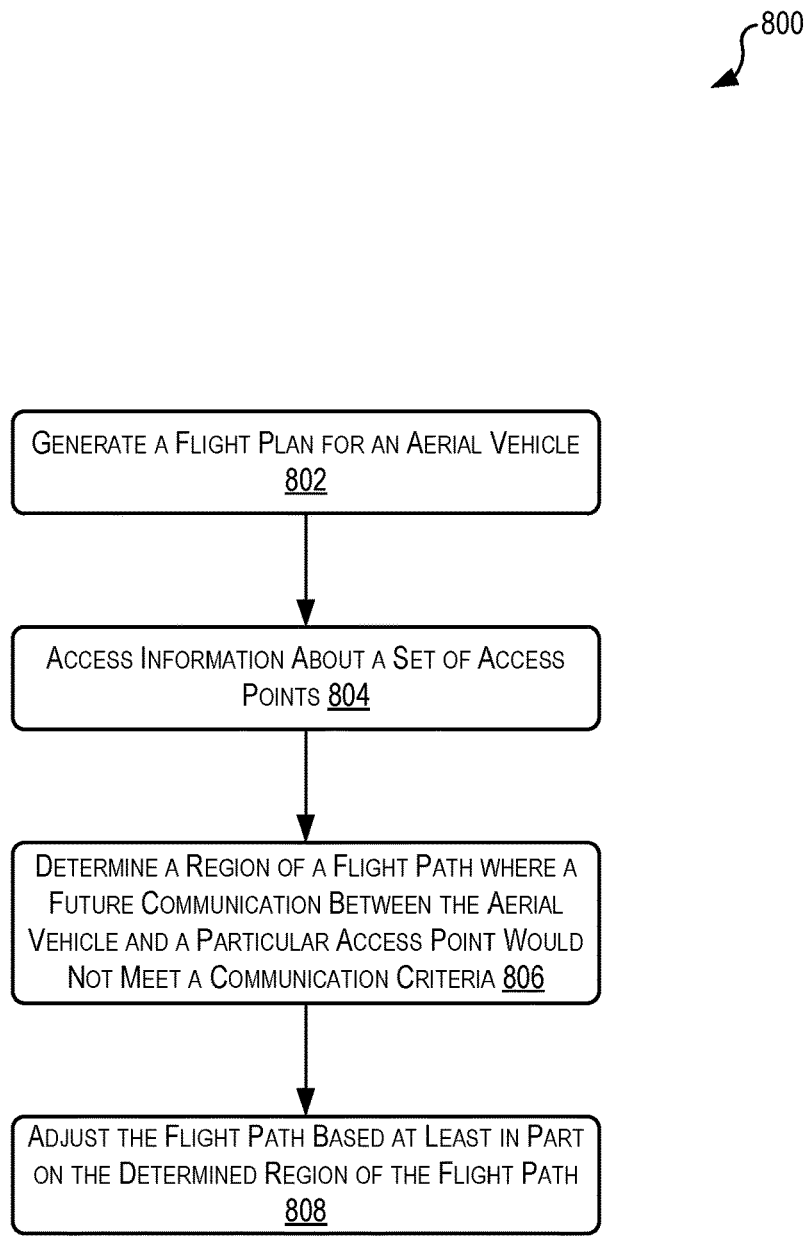
FIG. 8 is an example flow diagram depicting example acts for implementing techniques relating to generating flight plans for aerial vehicles based on communication performance, according to at least one example.

FIG. 8 illustrates the process 800 for generating flight plans for aerial vehicles based on communication performance, according to at least one example. In particular, the process 800 adjusts a flight path based at least in part on communication performance. The flight plan management engine 302, whether embodied in the aerial vehicle 106, the aerial vehicle management system 104, or a suitable combination of the foregoing, may perform the process 800 of FIG. 8.

The process 800 begins at 802 by generating a flight plan for an aerial vehicle. This may be performed by the flight planning module 404 (FIG. 4). Generating the flight plan may be based at least in part on first information about a first geographic location and second information about a second geographic location. The flight plan may include (i) a flight path that extends between the first geographic location and the second geographic location, (ii) directions for the aerial vehicle to navigate between the first geographic location and the second geographic location, and (iii) velocities for the aerial vehicle.

At 804, the process 800 accesses information about a set of access points. This may be performed by the communication module 402 (FIG. 4). The set of access points may be stored in a map of access points. The set of access points may be disposed relative to the flight path. In some examples, the information about the set of access points may include (i) geographic information identifying a set of locations of the set of access points and/or (ii) bandwidth information identifying available bandwidth for individual access points of the set of access points.

At 806, the process 800 determines a region of a flight path where a future communication between the aerial vehicle and a particular access point would not meet a communication criterion. This may be performed by the flight planning module 404. In some examples, the information about the set of access points may be third information. Determining the region of the flight path may be based at least in part on the third information.

At 808, the process 800 adjusts the flight path based at least in part on the determined region of the flight path. This may be performed by the flight planning module 404. In some examples, adjusting the flight path may include computing a reduced speed value applicable to movements of the aerial vehicle within the determined region. In some examples, adjusting the flight path may include computing a flight path deviation that, when followed by the aerial vehicle, avoids the determined region. In this example, the flight path deviation may include a horizontal flight path deviation and/or a vertical flight path deviation.

Figure 9:
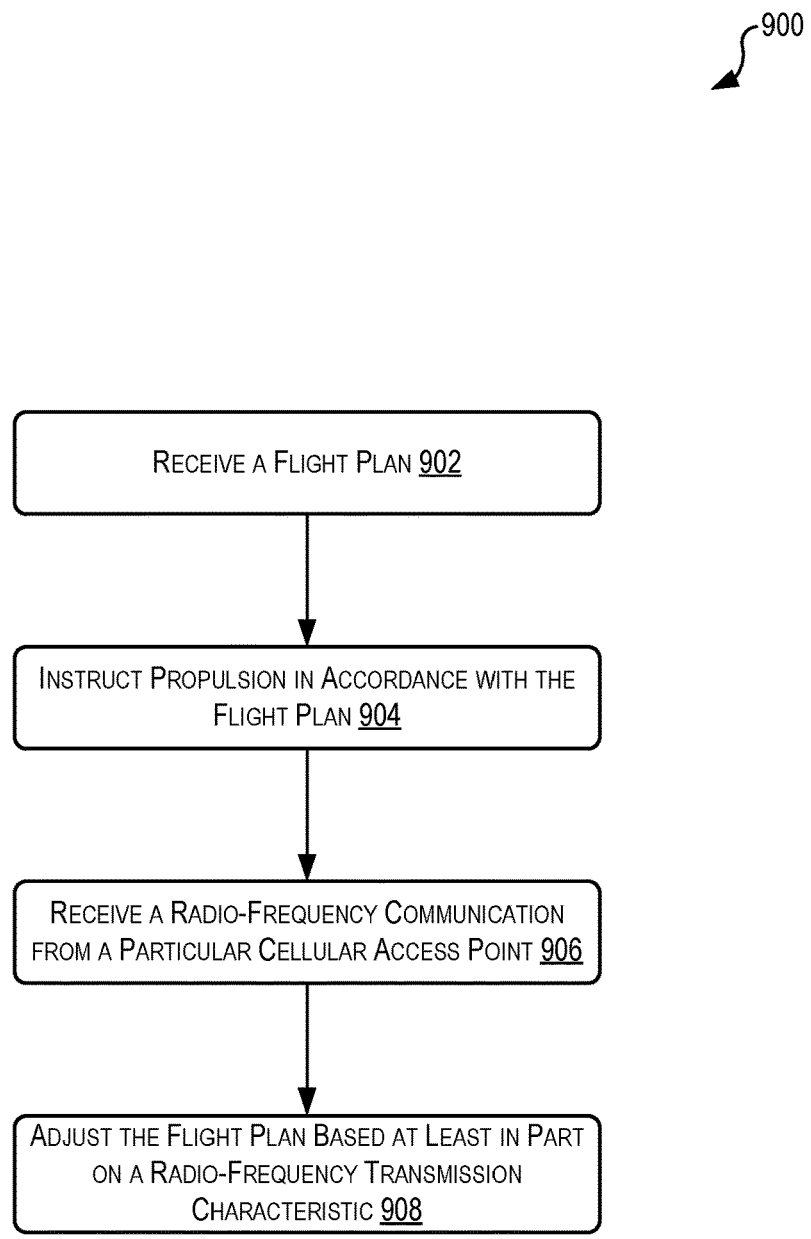
FIG. 9 is an example flow diagram depicting example acts for implementing techniques relating to generating flight plans for aerial vehicles based on communication performance, according to at least one example.

FIG. 9 illustrates the process 900 for generating flight plans for aerial vehicles based on communication performance, according to at least one example. In particular, the process 900 adjusts a flight path based at least in part on characteristic(s) of access points encountered while executing a flight plan. The flight plan management engine 302, whether embodied in the aerial vehicle 106, the aerial vehicle management system 104, or a suitable combination of the foregoing, may perform the process 900 of FIG. 9.

The process 900 begins at 902 by receiving a flight plan. This may be performed by the communication module 402 (FIG. 4). The flight plan may be received from an aerial vehicle management system. The flight plan may include (i) a beginning point, (ii) an end point, (iii) a set of directions defining a flight path for navigating between the beginning point and the end point, and (iv) a set of speeds corresponding to the set of directions. The set of speeds may be computed based at least in part on an expected radio-frequency transmission characteristic of a set of cellular access points. The set of cellular access points may be disposed along the flight path. In some examples, the expected radio-frequency transmission characteristic may include a signal quality characteristic, a bandwidth characteristic, a signal loss characteristic, and/or a intercarrier interference characteristic (e.g., a characteristic that defines one or more aspects communications affected by intercarrier interference).

At 904, the process 900 instructs propulsion in accordance with the flight plan. This may be performed by the navigation module 406 (FIG. 4). In some examples, instructing propulsion includes instructing a propulsion system of the aerial vehicle to propel the aerial vehicle in accordance with the flight plan.

At 906, the process 900 receives a radio-frequency communication from a particular cellular access point. This may be performed by the communication module 402. In some examples, the radio-frequency communication is received by a communication system of the aerial vehicle. The cellular access point may be one of the set of cellular access points. In some examples, the radio-frequency communication may be associated with a radio-frequency transmission characteristic. The radio-frequency transmission characteristic may be different from the expected radio-frequency communication characteristic. The radio-frequency communication may be received while the aerial vehicle is in flight.

At 908, the process 900 adjusts the flight plan based at least in part on the radio-frequency transmission characteristic of the radio-frequency communication. This may be performed by the flight planning module 404 (FIG. 4). The flight plan may be adjusted while the aerial vehicle is in flight. In some examples, adjusting the flight plan may include: adjusting the set of directions to cause the aerial vehicle to directionally deviate from the flight path, or adjusting the set of speeds to cause the aerial vehicle to speed up or to slow down during at least one segment of the flight path.

Figure 10:
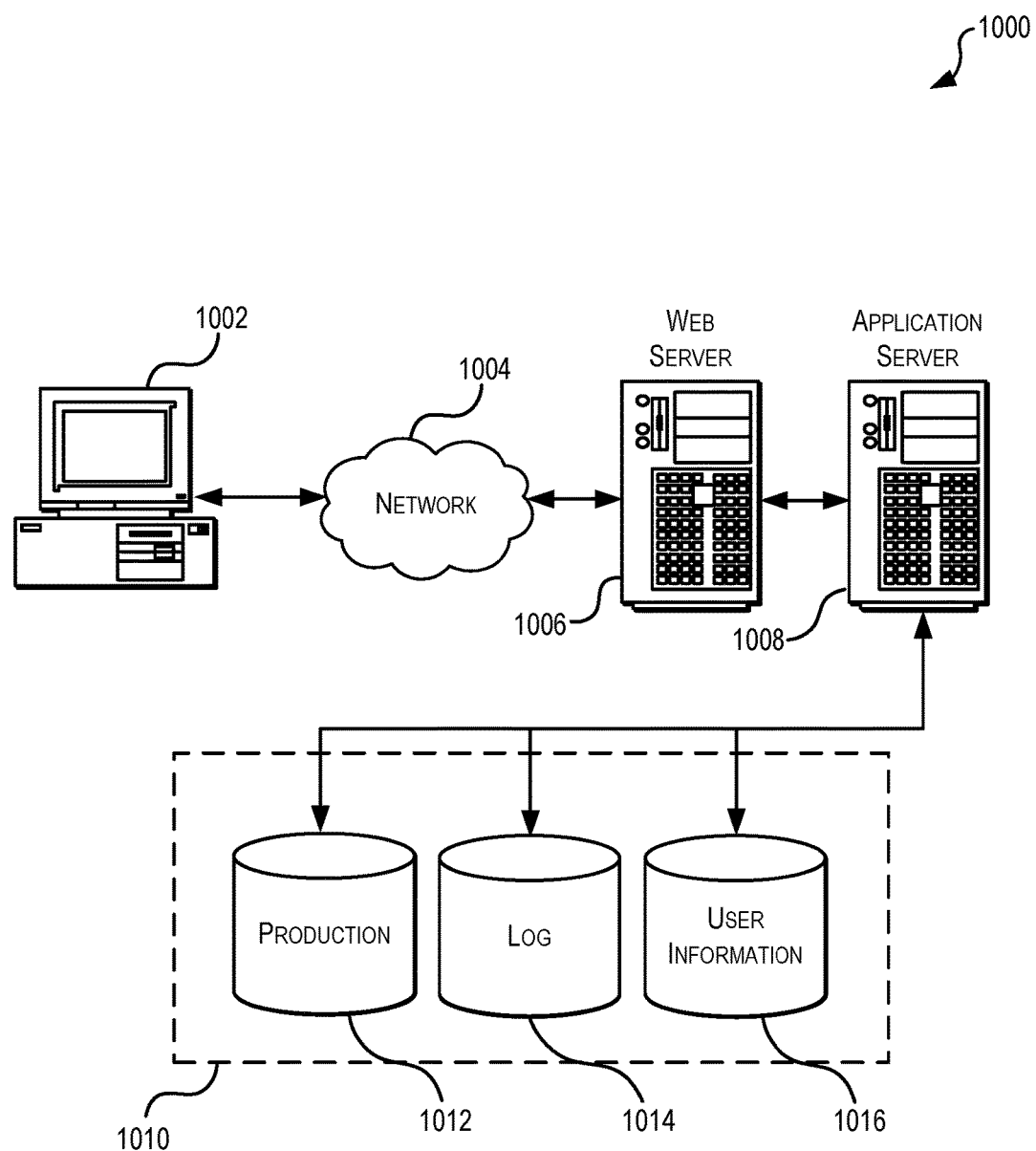
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   accessing first information about a set of access points configured to communicate with electronic devices using radio-frequency transmission;
   accessing second information about a flight path for an aerial vehicle, the flight path comprising a first point and a second point;

generating a set of directions for the aerial vehicle to move between the first point and the second point based at least in part on (i) a communication criterion applicable to communications of the aerial vehicle with the set of access points while the aerial vehicle moves between the first point and the second point and (ii) the second information about the flight path, the communication criterion representative of intercarrier interference in the communications; and updating the flight path based at least in part on the set of directions.

2. The computer-implemented method of claim 1, wherein individual access points of the set of access points are configured to communicate with the electronic devices using orthogonal frequency-division multiplexing (OFDM).

3. The computer-implemented method of claim 1, wherein:
the set of access points comprises a set of cellular towers disposed within a geographic region; and
the first point and the second point are disposed with the geographic region.

4. The computer-implemented method of claim 1, wherein the flight path comprises a shortest distance path between the first point and the second point.

5. The computer-implemented method of claim 1, wherein the communication criterion comprises a measure of throughput for the communications of the aerial vehicle with the set of access points.

6. The computer-implemented method of claim 5, wherein:
the communications comprise radio-frequency signals; and
the throughput accounted for by the measure of throughput is based at least in part on velocity of the aerial vehicle relative to the set of access points that causes changes to at least one of frequency of the radio-frequency signals or wavelength of the radio-frequency signals.

7. The computer-implemented method of claim 5, wherein:
the measure of throughput comprises a threshold percentage of throughput; and
generating the set of directions comprises determining a maximum speed for the aerial vehicle to move between the first point and the second point to ensure that the throughput in the communications of the aerial vehicle with the set of access points meets the threshold percentage.

8. The computer-implemented method of claim 1, wherein generating the set of directions comprises:
segmenting the flight path into a plurality of segments based at least in part on the second information; and
computing speed values for the individual segments of the plurality of segments based at least in part on the communication criterion.

9. The computer-implemented method of claim 8, wherein at least one segment of the plurality of segments is defined by a spline that is defined by a first polynomial function, and includes a set of speed values corresponding to the spline and defined by a second polynomial function.

10. The computer-implemented method of claim 8, wherein a portion of the plurality of segments form a curve relative to at least one access point of the set of access points.

11. The computer-implemented method of claim 1, wherein updating the flight path is further based at least in part on an optimization parameter comprising at least one of a time-to-destination parameter, a power consumption parameter, or a line-of-sight parameter.

12. An apparatus, comprising:
a frame;
a propulsion system attached to the frame;
a communication system attached to the frame; and
a computing device in communication with the propulsion system and the communication system, and configured to at least:
access first information about a set of access points configured to communicate with electronic devices using radio-frequency transmission;
access second information about a flight path for an apparatus, the flight path comprising a first point and a second point;
generate a set of directions for the apparatus to move between the first point and the second point based at least in part on (i) a communication criterion applicable to communications of the apparatus with the set of access points while the apparatus moves between the first point and the second point and (ii) the second information about the flight path, the communication criterion representative of intercarrier interference in the communications; and
update the flight path based at least in part on the set of directions.

13. The apparatus of claim 12, wherein individual access points of the set of access points are configured to communicate with the electronic devices using orthogonal frequency-division multiplexing (OFDM).

14. The apparatus of claim 12, wherein:
the set of access points comprises a set of cellular towers disposed within a geographic region; and
the first point and the second point are disposed with the geographic region.

15. The apparatus of claim 12, wherein the communication criterion comprises a measure of throughput for the communications of the apparatus with the set of access points.

16. The apparatus of claim 15, wherein:
the communications comprise radio-frequency signals; and
the throughput accounted for by the measure of throughput is based at least in part on velocity of the apparatus relative to the set of access points that causes changes to at least one of frequency of the radio-frequency signals or wavelength of the radio-frequency signals.

17. A system comprising:
a memory configured to store computer-executable instructions; and
a processor configured to access the memory and execute the computer-executable instructions to at least:
access first information about a set of access points configured to communicate with electronic devices using radio-frequency transmission;
access second information about a flight path for an aerial vehicle, the flight path comprising a first point and a second point;
generate a set of directions for the aerial vehicle to move between the first point and the second point based at least in part on (i) a communication criterion applicable to communications of the aerial vehicle with the set of access points while the aerial vehicle moves between the first point and the second point and (ii) the second information about the flight path, the communication criterion representative of intercarrier interference in the communications; and update the flight path based at least in part on the set of directions.

18. The system of claim 17, wherein generating the set of directions comprises:
  segmenting the flight path into a plurality of segments based at least in part on the second information; and
  computing speed values for the individual segments of the plurality of segments based at least in part on the communication criterion.

19. The system of claim 18, wherein at least one segment of the plurality of segments is defined by a spline that is defined by a first polynomial function, and includes a set of speed values corresponding to the spline and defined by a second polynomial function.

20. The system of claim 18, wherein a portion of the plurality of segments form a curve relative to at least one access point of the set of access points.

* * * * *